United States Patent

[11] 3,565,150

| [72] | Inventor | Harold A. Carr |
| | | 79 Melville Road, Hillsdale, N.J. 07642 |
| [21] | Appl. No. | 786,587 |
| [22] | Filed | Dec. 24, 1968 |
| [45] | Patented | Feb. 23, 1971 |

[54] TRACTION DEVICE
2 Claims, 7 Drawing Figs.

| [52] | U.S. Cl. | 152/218 |
| [51] | Int. Cl. | B60c 27/20 |
| [50] | Field of Search | 152/218 |

[56] References Cited
UNITED STATES PATENTS

| 2,426,683 | 9/1947 | Harrop | 152/218 |
| 2,837,133 | 6/1958 | Armenante et al. | 152/218 |

*Primary Examiner*—James B. Marbert
*Attorney*—Erwin Koppel

ABSTRACT: A tire traction device formed in three separate sections, each having a tire engaging portion and the sections being engageable for operation. The first section is Y-shaped with the other two sections fitting respectively into two legs of the Y. A movable member is mounted on one section and is pivotable to place all sections in tight engagement with the tire engaging portions gripping the tire.

PATENTED FEB 23 1971 3,565,150
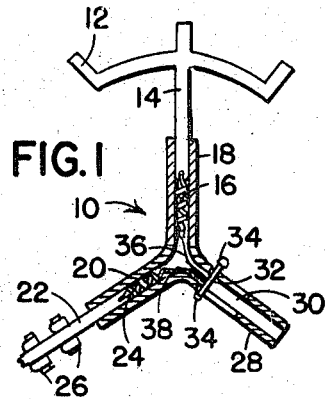
FIG.1
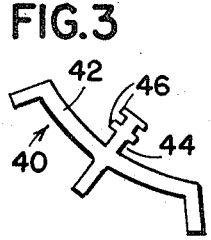
FIG.3
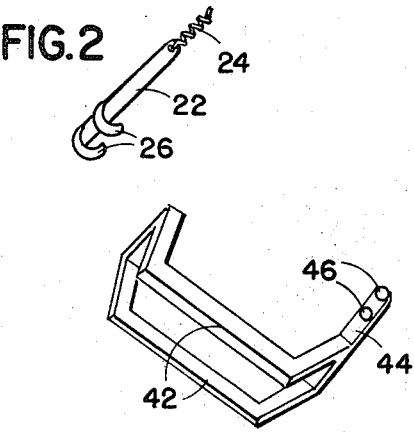
FIG.2
FIG.4
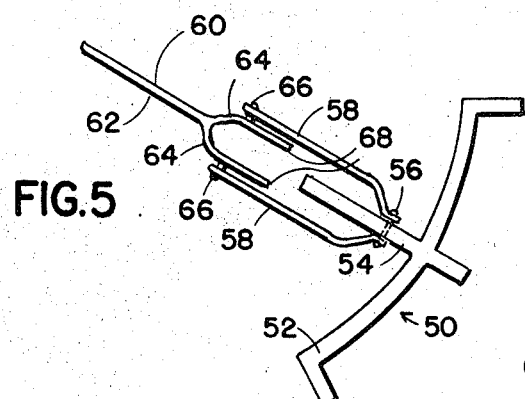
FIG.5
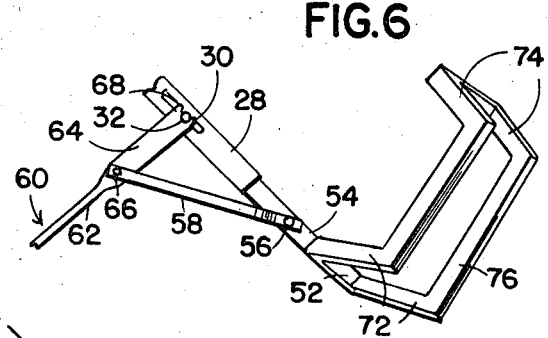
FIG.6
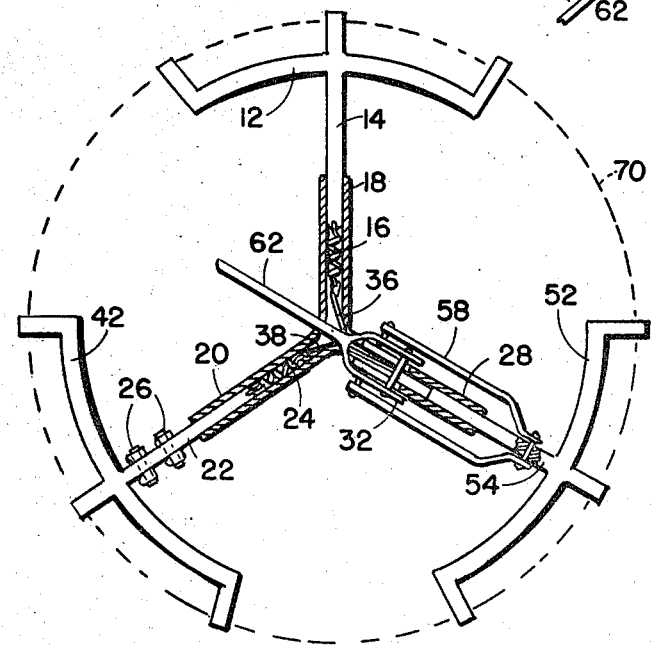
FIG.7
INVENTOR.
Harold A. Carr
by Erwin Koppel
ATTORNEY.

TRACTION DEVICE

The invention relates to a traction device and more particularly to a traction device for the tire of a motor vehicle that can be easily and quickly mounted and removed.

Under certain weather conditions, such as rain and snow, ice and mud, the tires of a motor vehicle will slop so that an improvement in traction is needed. In the prior art the conventional approach has been to use full chains which completely encircle the tire. Although full chains satisfactorily improve traction, they are very difficult to mount as the tire has to be jacked up to fasten the ends together. Similarly, the tire has to be jacked up to remove the chains. Moreover, in view of this difficulty in handling, the tendency is to keep them mounted too long, and they wear out rapidly in use. Because of this difficulty in mounting and removing full chains, strap or emergency chains have been used which can be mounted and removed without jacking up the tire. These emergency chains are mounted from the side of the tire and will improve traction. However, these emergency chains have also been unsatisfactory in use because of certain problems in mounting. Some are mounted by threading a strap through slots in the wheel hub, but this is quite difficult, particularly in cold weather, and also involves working with dirty parts of the vehicle under the fender and the inside of the wheel. Moreover, newer models of motor vehicles, such as automobiles, no longer have slots in the wheels for the straps to pass through. Other types of emergency chains have involved considerable effort and a degree of skill in mounting and tightening, and this is frustrating to most motorists and completely unworkable for the average lady motorist. Further, strap chains have to be put on individually at spaced locations around the wheel which involves a multiplicity of time and effort.

Accordingly, it is an object of the present invention to provide a tire traction device that is easily mountable and removable.

Another object of the invention is to provide an improved traction device that can be mounted and removed without coming in contact with dirty parts of the wheel and motor vehicle.

A further object of the invention is to provide a tire traction device in three easily handled separate sections that are easily assembled and disassembled on a tire from the side thereof.

A still further object of the present invention is to provide a tire traction device in separable sections that can be easily stored, easily applied from the side of the tire and placed in operable condition by a simple lever movement.

These and other objects will be apparent from the following description when read in connection with the accompanying drawings, in which:

FIG. 1 is a front view, partly in cross section, of a first section showing elements of the traction device embodying the present invention;

FIG. 2 is a side view of one of the elements shown in FIG. 1;

FIG. 3 is a front view of a second section of the traction device;

FIG. 4 is a side view of the second section shown in FIG. 3;

FIG. 5 is a front view of a third section of the traction device with the operating handle shown in the engaged position;

FIG. 6 is a side view of the third section shown in FIG. 5 with the operating handle shown in the released position; and FIG. 7 is a front view, partly in cross-section, showing the sections in assembled condition and the operating handle in the engaged position similar to FIG. 5.

Referring to FIG. 1 is a first section 10 of the tire traction device is formed in a generally Y-shaped. One leg of the Y-shaped section comprises a tire engaging portion or cage 12. The entire traction device includes three of these cages, shown in side view in FIGS. 4 and 6, and these cages are adapted to fit over and grip the tire at 120° locations to improve traction as will be hereinafter explained. As seen in FIG. 1, the Y-shape of section 10 has its legs spaced 120° apart. Cage 12 can be considered to form one end of the upper leg of the Y-shaped section 10 as it would be placed on the tire, and extending downwardly therefrom in a radially inward direction toward the center is a first element or rod 14. At the lower radially inner end or rod 14 is attached a biasing member or spring 16. Both the lower end of rod 14 and the spring 16 are slidably received in a first tubular leg 18 completing the upper leg of the Y-shaped element.

Attached to tubular section 18 in an integral manner are two tubular extensions at its lower radially inner end, each at a 120° angle to form the lower legs of the Y-shaped element 10. A second tubular leg 20 forms a first extension shown on the left of FIG. 1 and slidably receives a rod 22 that extends partly into tube 20 in the same manner that rod 14 extends partly into tube 18. At the radially inner end of rod 20 a biasing member or spring 24 is attached, and the outer end of rod 22 has a double hook arrangement 26 (see FIG. 2) formed thereon.

The Y-shaped element 10 includes a third tubular leg 28 forming a section extension and also extending at a 120° angle. A slot 30 extends through opposite sides of tube 28 (see FIGS. 1 and 6) so that a pin 32 can be slidably mounted therein. Pin 32 includes at opposite ends enlarged head portions 34 so that it will be slidably retained in slot 30.

As mentioned before, springs 16 and 24 are respectively connected at one end to rods 14 and 22. At the other end of each spring there is a connection to a cable. As shown in FIG. 1, cable 36 connects the end of spring 16 to pin 32. Such connection is provided by cable 36 being flexibly bent as it passes from the first hollow leg 18 to pin 32 in third hollow leg 28. Cable 38 connects the end of spring 24 in second hollow leg 20 to pin 32 by being flexibly bent as it passes through the hollow center of Y-shaped element 10 to third hollow leg 28. It will be appreciated from FIG. 1 that movement of pin 32 radially outwardly in slot 30 will cause cables 36 and 38 to apply bias on springs 16 and 24 tending to draw rods 14 and 22 radially inwardly.

Referring to FIGS. 3 and 4, a second section 40 of the tire traction device is shown. Section 40 includes a tire engaging portion or cage 42, which corresponds to cage 12 on first section 10. Cage 42 is adapted to fit over the tire at approximately a 120° angle location from cage 12, as shown in FIG. 7, so that second section 40 will be engageable with first leg 24 of first section 10. Such engagement is provided by a second element or rod 44 extending radially inwardly when section 40 is positioned on the tire with rod 44 terminating in a series of projections forming a double bar element 46 engageable with the double hook 26 of rod 22. It will be appreciated from this arrangement that application of a biasing force on spring 24 will act through the hook and bar connections 26, 46 to pull cage 42 radially inwardly to tightly grip the tire.

Referring to FIGS. 5 and 6, a third section 50 of the tire traction device is shown. Section 50 includes a tire engaging portion or cage 52, which corresponds to cage 12 and 42 previously described. Cage 52 is adapted to fit over the tire at approximately a 12° angle from cage 12, and approximately a 120° angle from cage 42, as shown in FIG. 7. Third section 50 is engageable with one leg of first section 10, and such engagement is shown in FIG. 6 which includes part of first section 10. Section 50 includes a third element or rod 54 extending inwardly from cage 52, and rod 54 is adapted to be received in hollow leg 28. At an intermediate location on rod 54 a pivot pin 56 is located to pivotally fix the ends of a pair of arms 58. Each arm 58 extends outwardly in an arced shape toward the center of the traction device as it extends a predetermined distance from pivot pin 56, and the remainder of each arm 58 then extends in a manner parallel to rod 54. The predetermined distance is an amount sufficient for each arm 58 to clear the sides of leg 28 as they extend therealong to be joined to a yoke member 60. As seen in FIG. 5 yoke 60 comprises an elongated handle portion 62 extending from two parallel leg portions 64. Leg portions 64 have a spacing such that they can each snugly fit on the inside of an arm 58 and be fastened thereto by a pivot pin 66.

As shown in FIG. 6 the legs 64 of yoke 60 have a width dimension greater than handle 62, and at the extreme end of each leg 64 a notched shape 68 is formed so that the yoke 60 can thereby be pivotally engaged at the notches with pin 32. Since cables 36 and 38 are attached to pin 32, and since pin 56 is fixed on rod 54, it will be appreciated that rotation of handle 62 from the position shown in FIG. 6 to the position shown in FIG. 7 will cause pin 32 to slide radially outwardly in slot 30 and effect the biasing force on springs 16 and 24 for the tight engagement of the three cages on the tire. This will be explained more in detail hereinafter.

In FIGS. 1, 4 and 6 the cages 12, 42 and 52 have been illustrated as each having a series of three prongs or loops formed to fit over the periphery of a conventional tire 70, shown in dotted lines in FIG. 7. Although three loops are shown on each cage in FIGS. 1, 3, 5 and 7 the invention is not to be considered so limited and two, four or another number of loops can be formed for each cage as desired to insure proper strength and gripping surfaces. As shown in FIG. 6, and this will be applicable to all cages, each loop comprises inclined leg portions 72 and 74 conforming generally to the outer shape of a conventional tire. The inclination is inward toward the outer edge of the tire to a connecting bar 76, and for purposes of clarity only two loops each have been shown in FIGS. 4 and 6. Connecting bars 76 provide the surfaces that provide the gripping action. They are shown in the drawings as plain bars, but in the actual embodiment they will include special treads, chains, cleats or projecting lugs, as well known in the art, for increasing the traction as the tire 70 is driven.

In order to mount the traction device of the present invention, the three sections are seen to be handled easily and individually. It is clear that the three sections 10, 40 and 50 shown in FIGS. 1, 3 and 5 can easily be stored, as in the trunk of an automobile, until needed, such as when snowy conditions are encountered. Section 10 is first mounted on the tire 70 by placing cage 12 over the top edge of the tire 70 as shown in FIG. 7. In this position springs 16 and 24 are in their relaxed unbiased state and pin 32, which is attached by cables 36 and 38 to the springs, is therefore at the radially inner end of slot 30 (see FIG. 6). Also because springs 16 and 24 are in relaxed condition rods 14 and 22 extend respectively only a minimum distance into hollow legs 18 and 20. This enables the motorist or other operator to easily apply the second and third sections as shown in FIG. 7. Second section 40 is easily mounted with cage 42 fitting over the tire 70 at the position of leg 20, and projecting bars 46 are locked into hooks 26. This connects second element 44 to element 22, which can be considered a fourth element. Third section 50 is easily mounted with cage 52 fitting over the tire 70 at the position of leg 28, and rod 54 is slid into hollow leg 28. As rod 54 is slid into place within leg 28, the notches 68 at the end of handle 62 are positioned around pin 32. This is easily done by moving the handle 62 to the positioned shown in FIG. 6. This operation of placing the three sections on the tire only takes a few seconds; the parts individually are light in weight and easily handled; and it is not necessary to contact the dirty parts or the wheel or motor vehicle. The three sections are now placed into tight engagement by rotating handle 62 from the position shown in FIG. 6 to the position shown in FIG. 7. As handle 62 is so rotated, pin 32 is slid to the other end of slot 30 as shown in FIG. 7. This has the result of drawing all three cages into tightly gripping engagement with the tire, since cage 52 is drawn inwardly as rod 54 is pulled into leg 28, and cages 12 and 42 are drawn inwardly as rods 14 and 22 are pulled into legs 18 and 20 by the pulling action of cables 36 and 38 on springs 16 and 24.

Springs 16 and 24 give a yielding action so that the device can be used even when there is a variation in the size of a tire from one motor vehicle to another. The springs 16 and 24 also provide that positive engagement is always achieved and constant bias maintained so that the cages will remain in place during operation. When a wheel is stuck in mud or snow, sometimes the automobile is rocked back and forth by reversing the drive. This changes the stress and torque to which the traction device is exposed so that some radial movement of the rods 14, 22 and 54 in the hollow legs will result. However, this is compensated for by the resilient action of springs 16 and 24, and no matter what stress is applied to the rods, the spring bias continually returns and maintains the rods in the position shown in FIG. 7. A further advantage of the invention is the provision of handle 62. This elongated handle gives a large mechanical advantage so that little effort is required to rotate the handle and move pin 32 to the radially outer position in slot 30 shown in FIG. 7. Moreover, the complete rotation of handle 62 to the position shown in FIG. 7 provides a positive lock for the traction device in the operating position since pins 32, 56 and 66, and the device can be unlocked only by the operator rotating handle 62 back to the position shown in FIG. 6. This positive lock can be provided with a conventional over-dead-center alignment. In such position handle 60 would be rotated so that a line connecting pivots 56 and 66 would be on the same side of pin 32 as cage 52.

From the above explanation it is clear that an improved traction device is disclosed that can be quickly applied to a tire with a minimum of effort. Moreover, when there is no longer any need for the increased traction, it is just as simple to remove the traction device by swinging handle 62 back to the position shown in FIG. 6. This releases the tension on springs 16 and 24 and allows rods 14, 22 and 54 to move outwardly to their maximum extended position wherein sections 40 and 50 are easily unhooked from section 10. Section 40 is unhooked by removing bars 46 from hooks 26, and section 50 is removed by sliding rod 54 out from leg 28 and allowing legs 64 with notches 68 to move away out of engagement with pin 32. The three sections are again handled individually and can be returned to storage, as in the trunk of the automobile, available for immediate use on any occasion.

Although a preferred embodiment is illustrated in the drawings, the invention is not to be considered limited thereto as the various shapes and elements can be modified within the inventive concept involved. Accordingly, the particular embodiment of the invention illustrated and described is to be considered illustrative only. The present invention includes such other modifications and equivalents as may readily occur to those skilled in the art, within the scope of the appended claims.

I claim:

1. A traction device for a tire comprising a first section including three tubular legs each extending radially at a 120° spacing from a central hollow rigid portion, a first one of said tubular legs including a slot with a slidable pin positioned therein, the second one of said tubular legs having a first rod slidably mounted therein, said first rod having a tire engaging portion mounted on said outer end thereof, the third one of said tubular legs having a second rod slidably mounted therein, said second rod having a pair of hooks formed adjacent its outer end; a second section being removably attachable to said second rod, said second section comprising a short rodlike extension having a tire engaging section mounted on its outer end and a double bar on its inner end that is removably lockable with said pair of hooks; a third section comprising a third rod with a tire engaging portion mounted on its outer end and being slidable within said first one of said tubular legs; each of said first and second rods having a spring attached at its inner end and extending radially inwardly, each of said springs respectively connected in series with a cable that respectively extends through said second and third tubular legs, said cables passing through said central hollow rigid portion and into said first tubular leg to be attached to said slidable pin; and a rotatable lever associated with said pin and having a separate connection to said third rod, said lever being rotatable inwardly to force said pin radially outward thereby applying bias on said springs to pull said tire engaging portions inwardly to tightly engage the tire.

2. A traction device according to claim 1, in which the separate connection of the rotatable lever comprises arm means connected at one end to an intermediate point of said rotatable lever and at the other end to said third rod, and said inward rotation of said lever thereby pulling said third rod inwardly to cause said tight engagement of the tire.